United States Patent [19]

Buckingham et al.

[11] Patent Number: 4,567,596
[45] Date of Patent: Jan. 28, 1986

[54] LASER APPARATUS

[75] Inventors: Amyand D. Buckingham, Cambridge, England; David P. Shelton, Toronto, Canada

[73] Assignee: National Research Development Corporation, London, England

[21] Appl. No.: 390,117

[22] Filed: Jun. 18, 1982

[30] Foreign Application Priority Data

Jul. 2, 1981 [GB] United Kingdom ............... 8120441

[51] Int. Cl.³ .............................................. H01S 3/10
[52] U.S. Cl. ........................................ 372/22; 372/87; 372/37
[58] Field of Search ..................... 372/87, 22, 37, 55, 372/61

[56] References Cited

U.S. PATENT DOCUMENTS

| | | | |
|---|---|---|---|
| 3,743,963 | 7/1973 | Bullis et al. | 372/87 |
| 4,007,430 | 2/1977 | Fletcher et al. | 372/87 |
| 4,080,578 | 3/1978 | Farish et al. | 372/87 |
| 4,481,632 | 11/1984 | Herbrich et al. | 372/61 |

Primary Examiner—William L. Sikes
Assistant Examiner—Léon Scott, Jr.
Attorney, Agent, or Firm—Cushman, Darby & Cushman

[57] ABSTRACT

A harmonic amplifier for a laser beam amplifies a harmonic frequency of the beam. The amplifier generates a series of electric fields across the beam, successive fields being directed oppositely. The spacing between the fields is related to the speed of propagation so as to amplify a particular harmonic. Typically this will be the second harmonic so that the amplifier acts as a frequency doubler. The fields can be provided by an array 6 of electrode pairs positioned on opposite sides of the beam 2 with a voltage generator 8 connected across the sets in alternately opposite sequence.

7 Claims, 2 Drawing Figures

LASER APPARATUS

FIELD OF THE INVENTION

This invention relates to laser apparatus. It is concerned with apparatus for generating a harmonic of the operating frequency of a laser, particularly the second harmonic frequency, in which case the apparatus acts as a frequency doubler.

One arrangement for frequency doubling is to pass a laser beam through an anisotropic crystal in which case a beam at a harmonic frequency of the input emerges at an angle to the incident beam. This itself has certain disadvantages and in any event such crystals are opaque at ultraviolet frequencies.

It is an object of the invention to provide laser apparatus in which a harmonic is generated in line with the incident beam and which is suitable for use at ultraviolet frequencies.

SUMMARY OF THE INVENTION

According to the invention laser apparatus includes means for enabling a beam of coherent electromagentic radiation to be propagated along a path, means for applying a plurality of directional electric fields across the path, the fields being spaced apart in sequence along the path and successive fields being directed oppositely, the spacing between the fields and the speed of propagation of the beam being so arranged as to amplify a harmonic frequency of the radiation.

Conveniently it is the second harmonic frequency of the radiation which is amplified but higher even harmonics can also be amplified.

In carrying out the invention the means for applying a plurality of electric fields may comprise a plurality of pairs of electrodes the electrodes of a pair being positioned on opposite sides of the path of the beam and a voltage generator having a pair of terminals the respective terminals of which are connected to individual electrodes of each pair in alternate sequence.

It is convenient to contain the electrodes in a pressure cell together with means for varying the pressure within the cell in order to control the speed of propagation of the beam along the path and so ensure the necessary correlation between the speed of propagation and the spacing of the electric fields.

The voltage generator may be a d.c. generator or else may be an a.c. generator in which case the output amplitude is modulated at the a.c. frequency.

BRIEF DESCRIPTION OF THE DRAWINGS

In order that the invention may be more fully understood reference will now be made to the accompanying drawings in which.

DETAILED DESCRIPTION OF THE INVENTION

Figure 1:
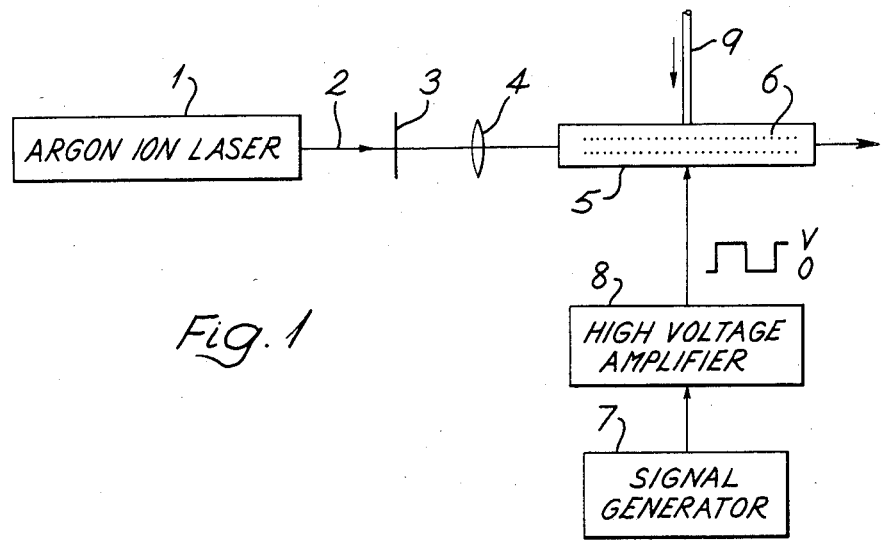
FIG. 1 is a diagram of laser apparatus embodying the invention.

Referring now to FIG. 1 a conventional laser, for example an argon ion laser 1 provides a beam 2 of coherent electromagnetic radiation. Beam 2 is polarized by means of a polarizer 3 and is focused by a lens 4 to pass through a pressure cell 5 containing electrode array 6.

Cell 5 is provided with means for supplying gas under pressure along a pipeline 9 and for measuring this pressure. The electrode array 6 within cell 5 is supllied from a squarewave signal generator 7 the output of which is amplified in a high voltage amplifier 8 and is then connected to the electrodes of array 6.

Figure 2:
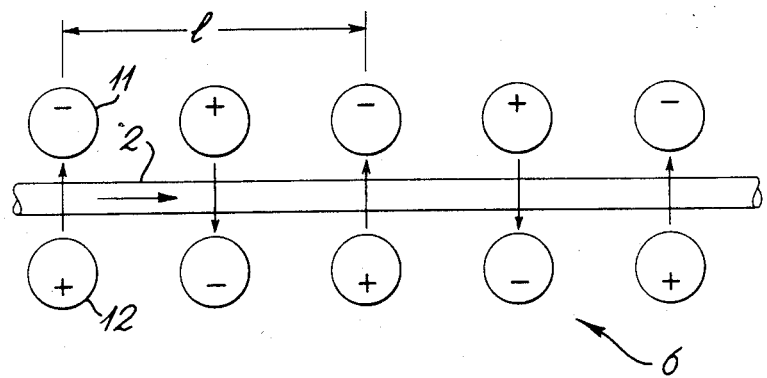
FIG. 2 shows a detailed view of part of the electrode array that is utilized.

The array 6 of electrodes in cell 5 is shown in more detail in FIG. 2. The array comprises a plurality of pairs of electrodes, for example the pair 11 and 12, with the electrodes of a pair being positioned on opposite sides of the path along which beam 2 travels through cell 5. Adjacent pairs of electrodes are spaced out along the path of beam 2 and successive electrodes along one side of the array are connected to opposite terminals of the high voltage supply from amplifier 8. This provides that when energized there is a succession of directional electric fields across the path of beam 2 with the fields being spaced apart in sequence along the path and successive electric fields have opposite directions. The direction of polarization of the beam may be parallel or perpendicular to the electric fields.

The pairs of electrodes are spaced apart by equal distances and in a typical example the electrodes comprise steel wire of 0.56 mm diameter and are spaced apart along the beam by 1.27 mm The array can be as long as desired, the longer it is the more there is an enhancement of the appropriate harmonic frequency. In one example the array was 20 cm in length.

In order to provide enhancement of the second harmonic the distance 1 between alternate pairs of electrodes, that is to say electrodes of the same polarity must be that $\Delta k = (4\pi/\lambda_w)(n_{2w} - n_w) = 2\pi/1$, where $\Delta k$ is the mismatch of the wave vectors for light waves in the sample with frequencies w and 2w, $\lambda_w$ is the vacuum wavelength of the incident beam, and $n_w$ and $n_{2w}$ are the refractive indices of the sample gas at frequencies w and 2w respectively. To obtain the correct value of k for periodic phase matching along the array the density of the gas in cell 5 is adjusted. Alternatively, phase matching for a tuneable frequency 2w could be achieved by varying the distance 1 in an extendable cell.

The factors which determine the power of the second harmonic component in the output of the beam from cell 5 is that the power of the second harmonic is approximately proportional to the square of the power of the fundamental, the square of the applied voltage and in the case of an unfocused laser beam to the square of the length of the array. Thus for a given input power and supply voltage the output power at the second harmonic is proportional to the square of the length of the array for an unfocused beam.

If it is desired to separate the second harmonic component of the beam from the fundamental the output beam from cell 5 can be passed through a monochromator. The apparatus described above is supplied with a modulated high voltage squarewave from amplifier 8 and the output beam will have a corresponding modulation. This may be convenient in detecting the beam or any resulting signal derived from use of the beam. Alternatively the electrodes array can be supplied with a constant high voltage in which case there will be no modulation of the output beam.

We claim:

1. A laser apparatus including:
    means for enabling a beam of coherent electromagnetic radiation to be propagated along a path; and
    electric field directing means for applying a plurality of directional electric fields across the path, the fields being spaced apart in sequence along the path and successive fields being directed oppositely, said electric field directing means comprising a plurality of pairs of electrodes positioned on opposite sides of the path and means for applying electric potential difference between the electrodes of a pair, the spacing between the fields being such that at a predetermined speed of propagation of the radiation a predetermined harmonic frequency of the radiation is enhanced.

2. The apparatus as claimed in claim 1 in which the harmonic frequency which is amplified is an even harmonic.

3. The apparatus as claimed in claim 2 in which the harmonic which is amplified is a second harmonic.

4. The apparatus as claimed in claim 1 in which the electrodes are contained in a pressure cell and means are provided for varying the pressure within the cell in order to control the speed of propagation of the beam along the path.

5. The apparatus as claimed in claim 1 in which said means for applying electric potential differences comprises a voltage generator having a pair of output terminals respective ones of which are connected to individual electrodes of each pair in alternate sequence.

6. The apparatus as claimed in claim 5 in which the voltage generator is a dc generator.

7. The apparatus as claimed in claim 5 in which the generator is an ac generator so that the harmonic frequency is modulated at the frequency of the generator.

* * * * *